United States Patent
Riehl

(10) Patent No.: US 7,504,812 B2
(45) Date of Patent: Mar. 17, 2009

(54) TRANSIENT BEHAVIOR WHILE SWITCHING BETWEEN CONTROL LOOPS IN A SWITCHING VOLTAGE REGULATOR

(75) Inventor: Patrick S. Riehl, Cambridge, MA (US)

(73) Assignee: Mediatek, Inc., Hsin-Chu (TW)

( * ) Notice: Subject to any disclaimer, the term of this patent is extended or adjusted under 35 U.S.C. 154(b) by 208 days.

(21) Appl. No.: 11/506,957

(22) Filed: Aug. 18, 2006

(65) Prior Publication Data

US 2007/0046273 A1    Mar. 1, 2007

Related U.S. Application Data

(60) Provisional application No. 60/710,697, filed on Aug. 23, 2005.

(51) Int. Cl.
*G05F 1/40*    (2006.01)
(52) U.S. Cl. .................. 323/283; 323/272; 323/224
(58) Field of Classification Search ......... 323/282–288, 323/266, 272; 363/16, 17
See application file for complete search history.

(56) References Cited

U.S. PATENT DOCUMENTS 5,162,987 A  * 11/1992 Sambhu ............... 700/42

RE37,609 E    3/2002  Bittner
6,396,250 B1 *  5/2002  Bridge ...................... 323/283
2005/0057238 A1  3/2005  Yoshida

FOREIGN PATENT DOCUMENTS

| EP | 1213822 | 6/2002 |
|----|---------|--------|
| JP | 11089222 | 3/1999 |
| JP | 2002300774 | 10/2002 |
| JP | 2003070242 | 3/2003 |

OTHER PUBLICATIONS

Xiao et al., "An Ultra-Low-Power Digitally-Controlled Buck Converter IC for Cellular Phone Applications" 2004 IEEE, 0-7803-8270-6/04.

* cited by examiner

*Primary Examiner*—Rajnikant B Patel
(74) *Attorney, Agent, or Firm*—Gauthier & Connors LLP

(57) ABSTRACT

A voltage switching regulator includes a pulsewidth modulation (PWM) controller providing voltage regulation when the voltage switching regulator is experiencing being in an high-power mode. A pulse-frequency modulation (PFM) controller provides voltage regulation when the voltage switching regulator is experiencing being in a low-power mode. An error-voltage estimator enables switching between the low-power mode and the high-power mode while keeping the voltage switching regulator output in regulation between the desired minimum and maximum voltages.

16 Claims, 7 Drawing Sheets

US 7,504,812 B2

TRANSIENT BEHAVIOR WHILE SWITCHING BETWEEN CONTROL LOOPS IN A SWITCHING VOLTAGE REGULATOR

PRIORITY INFORMATION

This application claims priority from provisional application Ser. No. 60/710,697 filed Aug. 23, 2005, which is incorporated herein by reference in its entirety.

BACKGROUND OF THE INVENTION

The invention relates to the field of switching regulators, and in particular to being able to switch between two control modes while keeping a regulator output in regulation.

Many switching regulators use two distinct control loops; one for high-power operation and one for low-power operation. Traditionally, there have been significant difficulties in being able to switch between two control modes while keeping a switching regulator output in regulation between the minimum and maximum voltages specified in the datasheet. When switching from low-power control to high-power control, experience with previous versions of the regulator show that the voltage may decrease to about 200 mV below the ideal regulation point, 100 mV below the datasheet minimum voltage. It takes a few tens of cycles before an equilibrium state is achieved which hinders performance.

SUMMARY OF THE INVENTION

According to one aspect of the invention, there is provided a voltage switching regulator. The voltage switching regulator includes a pulsewidth modulation (PWM) controller providing voltage regulation when the voltage switching regulator is in high-power mode. A pulse-frequency modulation (PFM) controller provides voltage regulation when the voltage switching regulator is in low-power mode. An error-voltage estimator enables switching between the low-power mode and the high-power mode while keeping the voltage switching regulator output in regulation between the desired minimum and maximum voltages.

According to another aspect of the invention, there is provided a method for performing voltage switching regulation. The method includes providing a pulsewidth modulation (PWM) controller that provides voltage regulation when the voltage switching regulator is in high-power mode. Also, the method includes providing a pulse-frequency modulation (PFM) controller that provides voltage regulation when the voltage switching regulator is in low-power mode. An error-voltage estimator is provided that enables switching between the standby mode and the active mode while keeping the voltage switching regulator output in regulation between the desired minimum and maximum voltages.

DETAILED DESCRIPTION OF THE INVENTION

Figure 1:
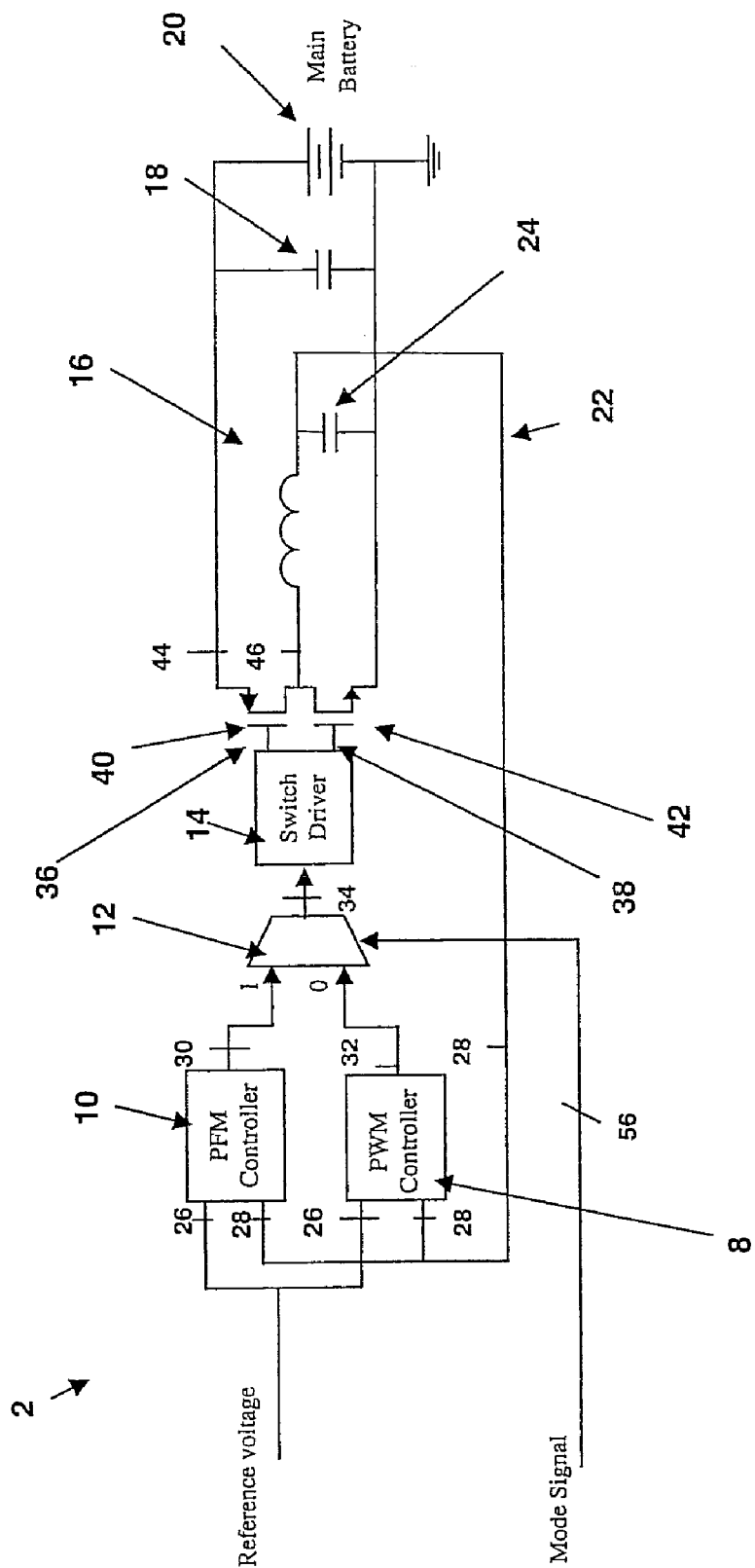
FIG. 1 is a schematic diagram demonstrating a switching regulator in accordance with the invention.

A switching regulator 2 has two distinct control loops, a pulsewidth modulation (PWM) controller 8 and a pulse-frequency modulation (PFM) controller 10, as shown FIG. 1. In high-power mode, the PWM controller 8 is used. This control loop provides efficient (85%-90%) power conversion for load currents from approximately 10 mA to 300 mA. It has a high-gain error amplifier that regulates the output voltage within to about 5 mV accuracy over the full range of line voltages and load currents. In low-power mode, the PFM controller 10 is used to supply up to 10 mA of load current while consuming less quiescent current.

The PFM controller 10 receives as input an output signal 26 from a voltage reference and a voltage feedback signal 28. The PWM controller 8 receives as input the reference signal 26 and the feedback signal 28. A multiplexer 12 receives as input the output signal 32 from the PWM controller 8 and the output signal 30 from the PFM controller 10. A switch driver 14 receives as input an output signal 34 from the multiplexer 12. The multiplexer 12 receives as a control input a digital mode signal 56 indicating PFM mode with a value of 1 and PWM mode with a value of 0. The outputs 36, 38 of the switch driver 14 are coupled to PMOS output device 40 and NMOS output device 42, respectively. The gate of the PMOS output device 40 is coupled directly to the switch driver and the source is connected to the main battery power supply 44. The drain of the PMOS output device 40 is coupled to a switched power terminal 46. The gate of the NMOS output device 42 is coupled directly to the switch driver 14 and the source of is coupled directly to ground. The drain of the NMOS output device 42 is coupled to the switched power terminal 46.

The MOSFETs 40, 42 are coupled directly to a filter structure 16. The filter structure 16 produces the output voltage 22. The filter structure 16 includes an inductor 22 coupled to a capacitor 24 and the drains of the MOSFETs 40, 42 and the switched power terminal 46. The other end of the capacitor 24 is coupled to ground. The output filtered signal 22 is connected to the controllers as a feedback voltage 28.

Figure 2:
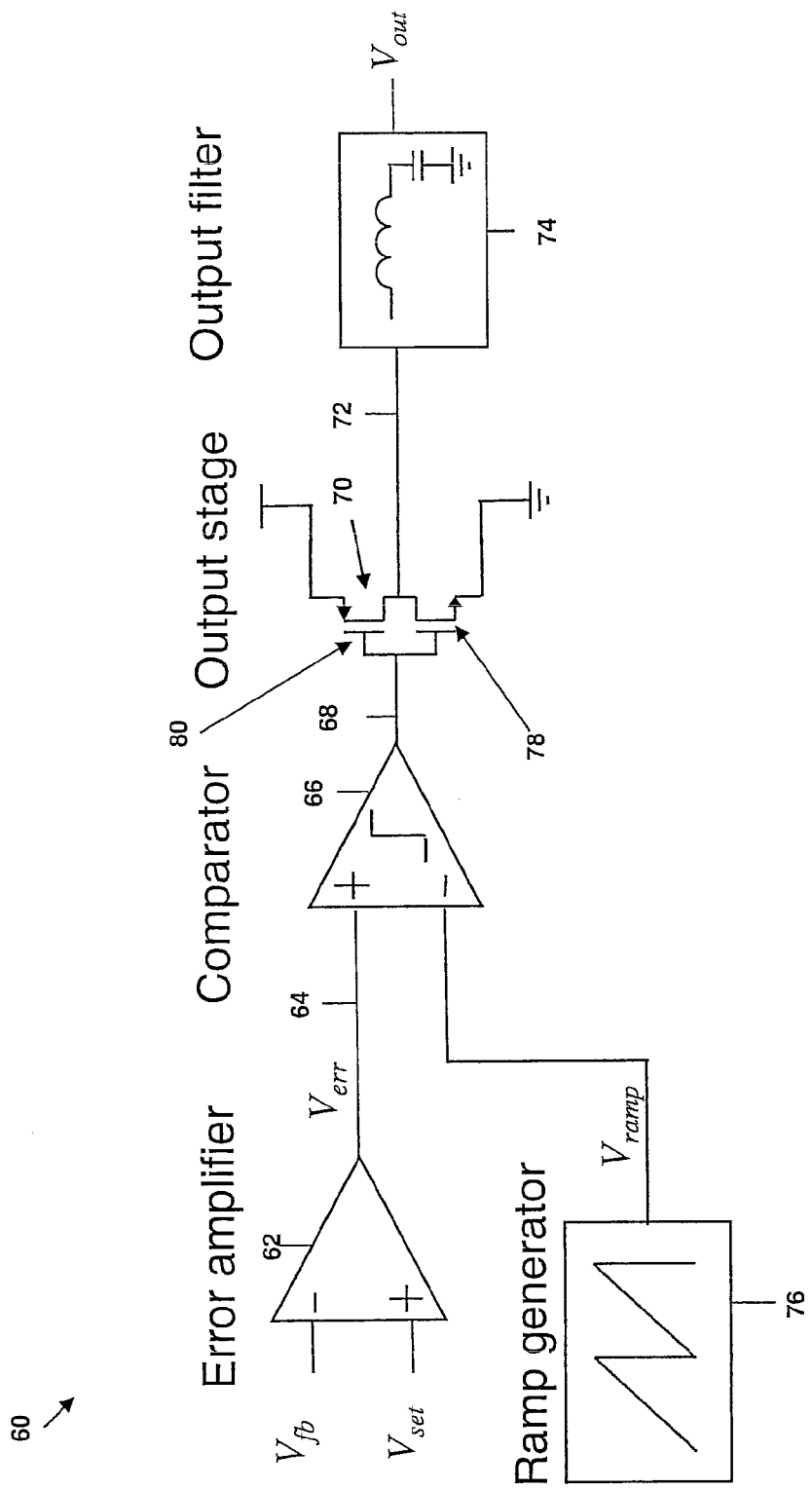
FIG. 2 is a schematic diagram demonstrating a pulsewidth modulation (PWM) controller.

The general architecture of the PWM controller 60 is shown in FIG. 2. The PWM controller 60 is structured in a loop arranged and includes an error amplifier 62 that outputs an amplified and filtered difference signal 64 between the target output voltage, $V_{set}$, and the feedback voltage, $V_{fb}$. This error voltage 64 is compared to an internally-generated ramp function 76 via a comparator 66. The output signal 68 of the comparator 66 controls the power switches in the output stage 70. The output stage 70 drives an external LC filter arrangement 74 using the switched power terminal 72 to generate the regulated output voltage $V_{out}$. The regulated output voltage $V_{out}$ is connected to $V_{fb}$ to complete the feedback loop.

Note the output stage 70 includes two MOSFETs, which are NMOS 78 and PMOS 80 output devices. The gates of the PMOS output device 80 and the NMOS output device 78 are coupled directly to the output signal 68 of the comparator 66. The source of the PMOS output device 80 is coupled to the main battery power supply. The drain of the PMOS output device 80 is coupled to the output signal 72, which drives the filter arrangement 74. The source of the NMOS output device 78 is coupled to ground and the respective drain is coupled to the output signal 72.

In order to provide an output voltage with low ac ripple, the LC filter arrangement 74 has a bandwidth much lower than the switching frequency of the PWM controller 60, in this case a few kHz. In order to compensate for the low-frequency complex-pole pair created by the LC filter arrangement 74, the error amplifier 62 must be compensated using a filter that has zeros at roughly the same frequencies. Because of this compensation, the error amplifier 62 responds with a much slower time constant than the switching stage.

Figure 3:
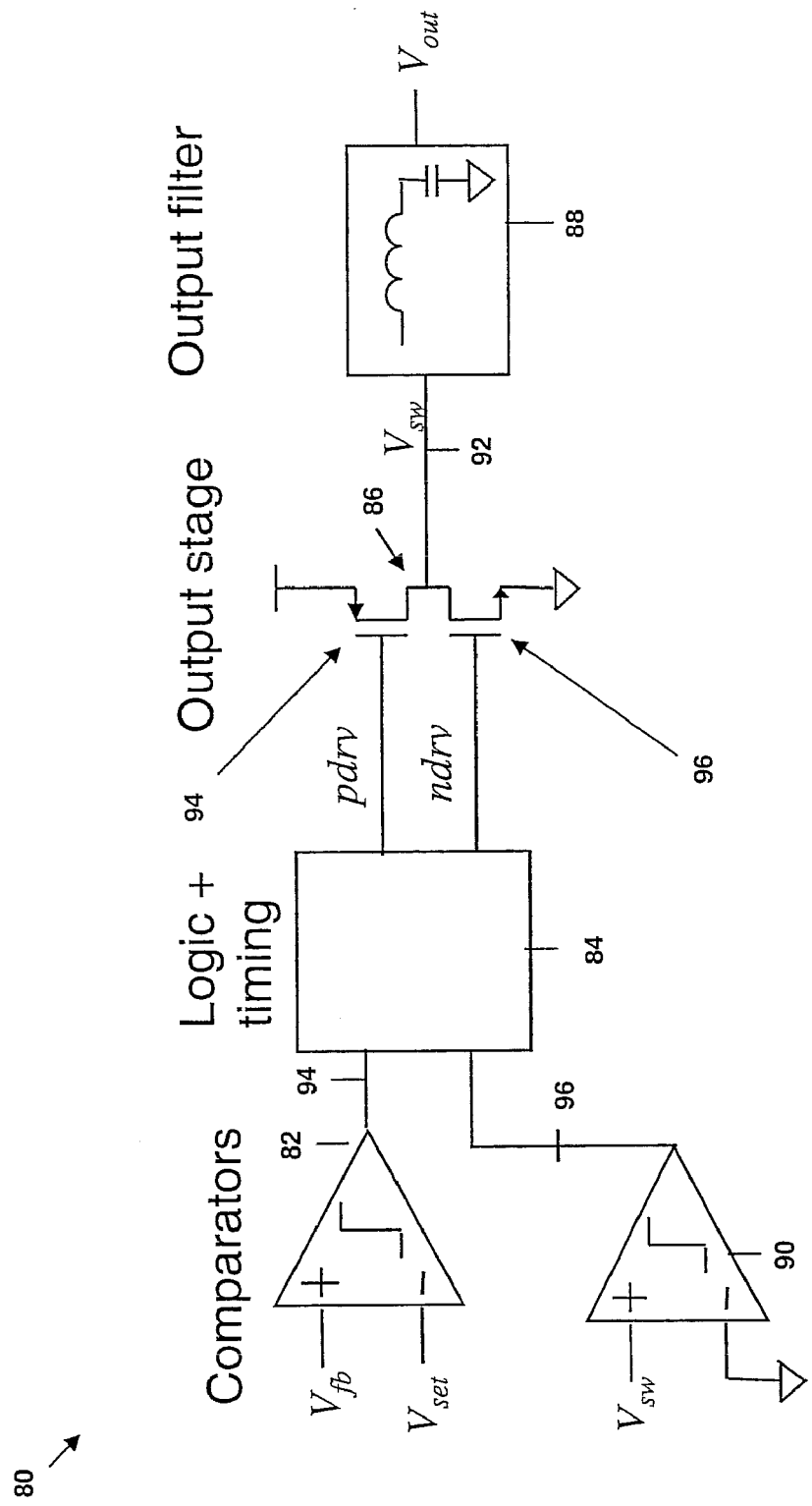
FIG. 3 is a schematic diagram demonstrating a pulse-frequency modulation (PFM) controller.

FIG. 3 shows the low-power mode control loop, which uses a pulse-frequency modulation (PFM) controller 80. Only one continuous-time comparator 82 is on during the full PFM cycle, which allows this controller to use very little quiescent power (10 uA). When $V_{fb}$ drops below $V_{set}$, the PFM comparator 82 triggers via signal 94 the logic and timing block 84 to produce a signal to the output stage 86 that initiates a current pulse of fixed duration. This pulse is controlled by the signal pdrv, which is connected to the gate of the PMOS output device 94, and the signal ndrv, which is connected to the gate of the NMOS output device 96. The same output stage 86 is shared between the PWM and PFM controllers. The logic and timing block 84 initiates a fixed on-time pulse of the PMOS output device 94 using the signal pdrv. Following this pulse, the NMOS output device 96 is turned on using the signal ndrv until the current in the inductor in the LC filter arrangement 88 returns to zero. Once this occurs, both output devices 94, 96 are shut off until $V_{out}$ drops below $V_{set}$ again. For low currents, the PFM controller 60 is stable without compensation.

The logic and timing block receives as input an output signal 96 from a comparator 90. This signal indicates when the current flowing from the output stage 86 into the output filter 88 is less than zero. The comparator 90 receives as input the output signal 92 that drives the filter arrangement 88 and ground.

It is important for the user to be able to switch between the two control modes while keeping the regulated output between the desired minimum and maximum voltages. When making a transition from low-power (PFM) control to high-power (PWM) control, experience with previous versions of the switching regulator has shown that the voltage may decrease to about 200 mV below the ideal regulation point, 100 mV below the datasheet minimum voltage. The problem is inherent to the voltage-mode PWM loop. Because the PWM error amplifier responds slowly relative to the switching frequency, it takes a few tens of cycles before the PWM loop reaches its equilibrium state.

Figure 4:
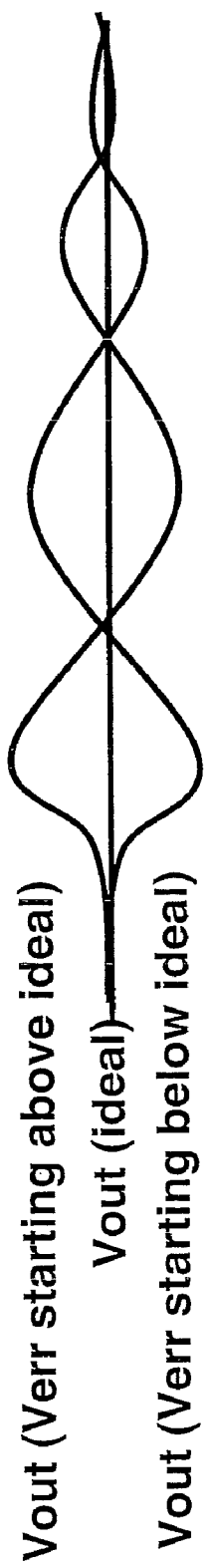
FIG. 4 is a graph demonstrating the problems switching between PFM and PWM modes.

During this settling interval, the duty cycle applied to the output stage may be much lower or much higher than needed, and it may oscillate both above and below the correct equilibrium duty cycle, as shown in FIG. 4. The charge transferred into or out of the LC filter arrangement during this interval can cause the output voltage to vary by hundreds of mV.

The invention includes a circuit, active during PFM mode, that estimates the equilibrium voltage at the output of the error amplifier that will be required in PWM mode. If the ideal equilibrium error voltage is applied as an initial condition at the output of the error amplifier when transitioning into PWM control, the transient disturbance during the changeover will be completely suppressed.

Figure 5:
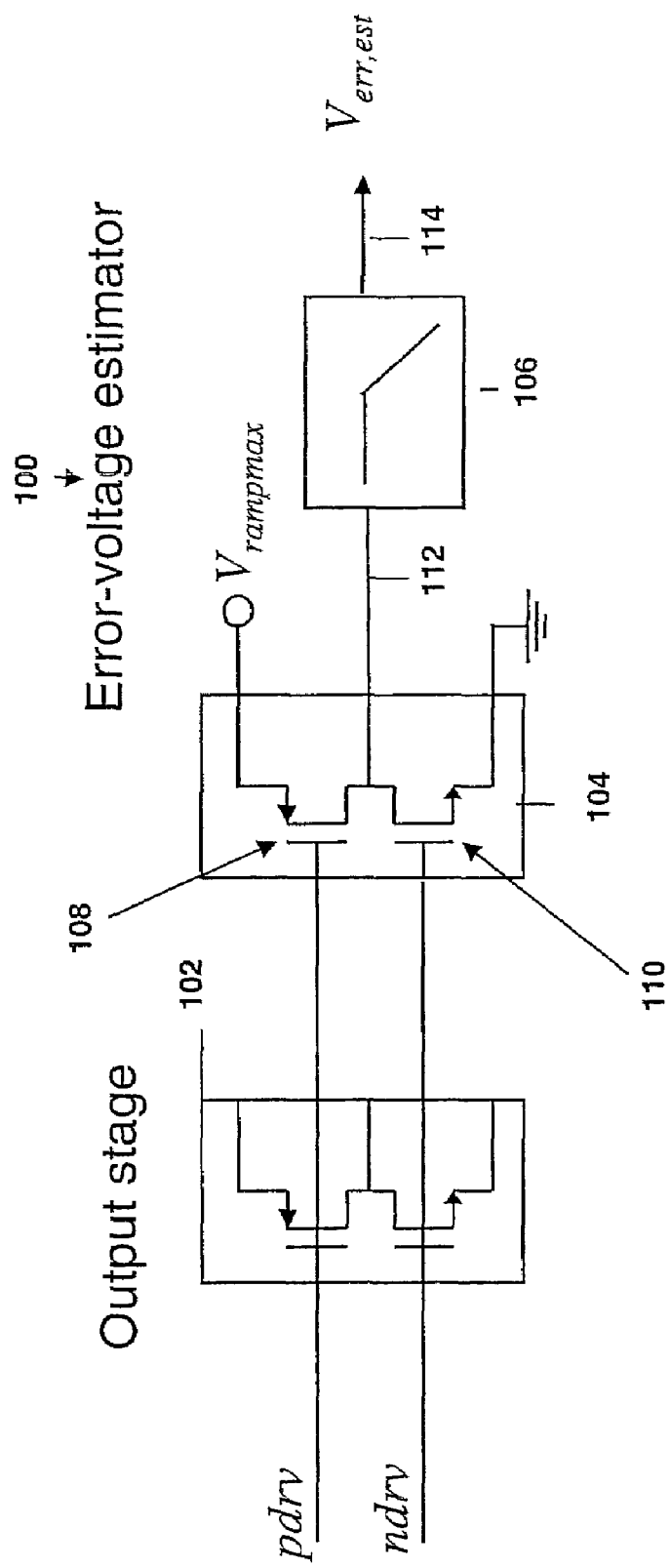
FIG. 5 is a schematic diagram demonstrating the inventive error-voltage estimator.

Conceptually, the circuit makes use of the fact that the PWM and PFM duty cycles are both identically equal to $V_{out}/V_{in}$, as shown in FIG. 5. The regulator output stage 102 is now coupled to an error-voltage estimator 100. The error-voltage estimator 100 includes a replica output stage 104 and a low-pass filter 106. The replica output stage 104 receives the signals pdrv and ndrv from the output stage 102 of a PFM controller and a maximum ramp voltage (Vrampmax). Note the replica output stage 104 includes NMOS 110 and PMOS output 108 devices. The gate of PMOS output device 108 is coupled directly to the output signal pdrv. The source of the PMOS output device 108 is coupled to a maximum ramp voltage (Vrampmax). The drain of the PMOS output device 108 is coupled to the digital error signal 112, which drives a low-pass filter 106. The gate of the NMOS output device 110 is coupled to the output signal ndrv. The source of the NMOS output device 110 is coupled to ground and the respective drain is coupled to the digital error signal 112.

The digital error signal 112 is a square wave with a magnitude equal to Vrampmax and a duty cycle equal to the duty cycle of the PFM controller, which is equal to Vout/Vin. The average value of the digital error signal is equal to the equilibrium error voltage of the PWM loop operating under the same conditions. The low-pass filter generates an estimated error voltage 114 with the same average voltage as the digital error signal 112.

The digital error signal 112 from the error stage 104 drives the low-pass filter stage 106. The output signal 114 produced by the error stage 106 is the estimated equilibrium error voltage (Verr,est). The estimated equilibrium error voltage is equal to the maximum ramp voltage multiplied by the PFM duty cycle. The maximum ramp voltage is generated internally and is available during PFM operation. The duty cycle information is encoded in the signals that drive the output stage 102 in the PFM controller, pdrv and ndrv.

Figure 6:
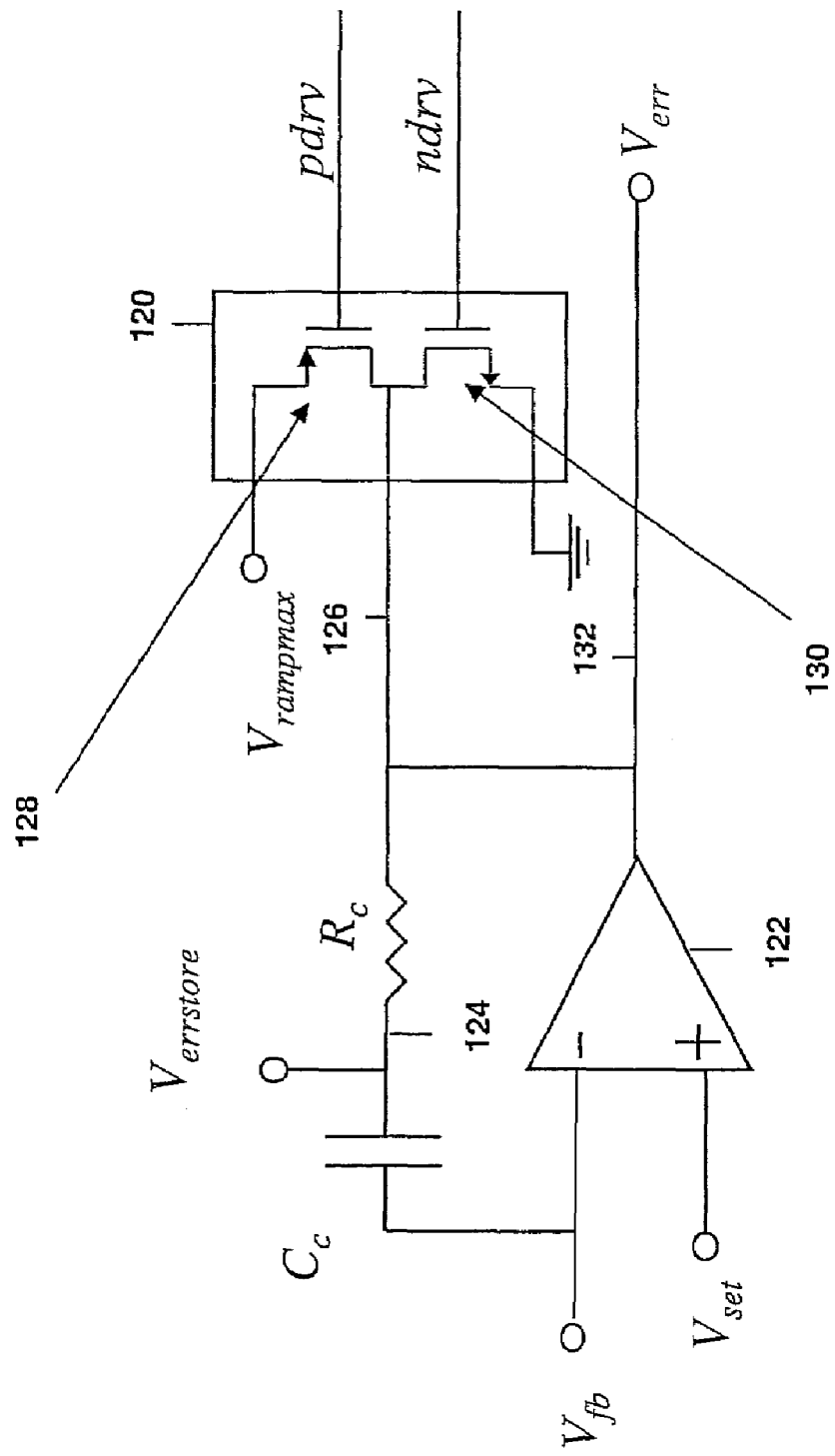
FIG. 6 is a schematic circuit diagram demonstrating the error-voltage estimator being incorporated with an error amplifier.

FIG. 6 shows the error estimator circuit 120 being integrated into the error amplifier circuit 122 of a PWM controller. The error voltage estimator 120 circuit uses signals pdrv and ndrv associated with a PFM controller to drive using an output signal 126 a low-pass filter arrangement 124 formed by the compensation network around the error amplifier. The resulting filtered voltage $V_{errstore}$ is the estimated equilibrium error voltage. The error estimator circuit 120 includes a configuration of MOSFETs similar to the replica output stage 104 shown in FIG. 5. Note the error estimator circuit 120 includes NMOS 130 and PMOS output 128 devices. The gate of PMOS output device 128 is coupled directly to the output signal pdrv. The source of the PMOS output device 128 is coupled to a maximum ramp voltage (Vrampmax). The drain of the PMOS output device 128 is coupled to the digital error signal 126, which drives the circuit arrangement 124. The gate of the NMOS output device 130 is coupled to the output signal ndrv. The source of the NMOS output device 130 is coupled to ground and the respective drain is coupled to the digital error signal 126.

The error amplifier only drives its output 132 when the PWM controller is active. The error amplifier receives as input the signals $V_{set}$ and $V_{out}$. Note the error amplifier circuit 122 is arranged with a compensation network 124 having the capacitor $C_c$ and resistor $R_c$. Note the voltage across the capacitor $C_c$ provides storage of the estimated equilibrium error voltage ($V_{errstore}$).

During the "dead-time" in PFM, when neither switch is closed, no charge is transferred onto or off of the integration capacitor, so the computation is not affected.

In PWM mode, the amplifier 122 is active and the error-voltage estimator circuit 120 is inactive. In PFM mode, the amplifier output 132 is high-impedance and the voltage $V_{err}$ is controlled by the error-voltage estimator 120. The resistor $R_c$ and capacitor $C_c$ in the circuit arrangement 124 form the low-pass filter of the error-voltage estimator.

The elements used to form the error amplifier circuit 120 and circuit arrangement 124 are large on-chip passives, so reusing them in this manner saves significant chip area. The difference between the feedback voltage $V_{fb}$ and the estimated error voltage $V_{err}$ is stored across $C_c$, the large compensation capacitor $C_c$. Since this capacitor limits the settling of the error amplifier 122, pre-charging it to the correct voltage ensures that the PWM loop will start up close to the equilibrium point.

Figure 7:
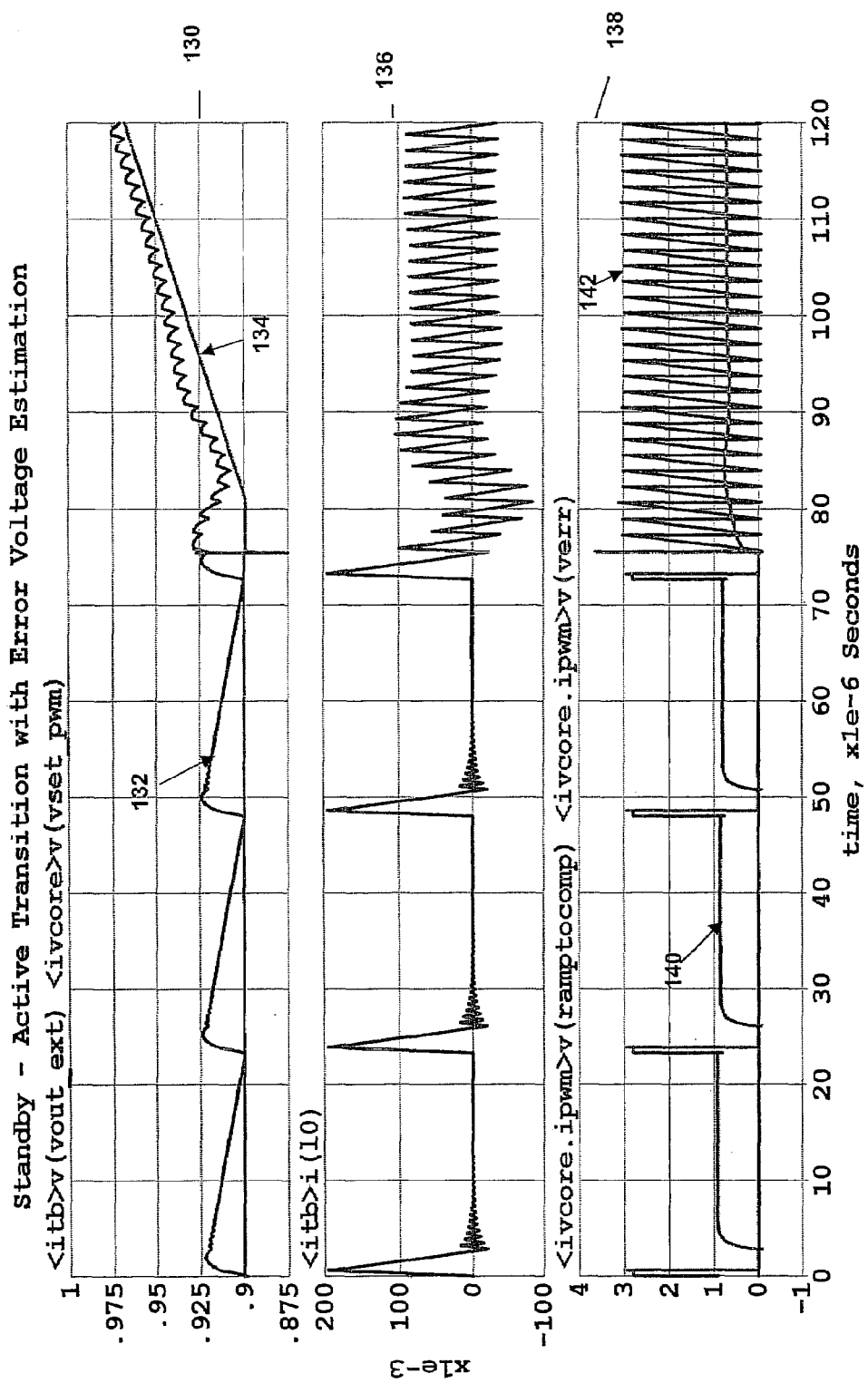
FIG. 7 shows graphs demonstrating the performance of the invention.

FIG. 7 shows a simulated transition from low- to high-power mode using the error-voltage estimator. The graph 130 shows output voltage 132 and target output voltage 134. The graph 136 shows inductor current. The graph 138 shows the voltage $V_{err}$ 140 and the ramp voltage 142. The graphs 130, 136, and 138 do not show no significant overshoot or undershoot observed thus minimizing potential errors in switching between PFM and PWM modes.

Although the present invention has been shown and described with respect to several preferred embodiments thereof, various changes, omissions and additions to the form and detail thereof, may be made therein, without departing from the spirit and scope of the invention.

What is claimed is:

1. A voltage switching regulator comprising:
    a pulsewidth modulation (PWM) controller for providing voltage regulation when said voltage switching regulator is experiencing being in a high-power mode;
    a pulse-frequency modulation (PFM) controller for providing voltage regulation when said voltage switching regulator is experiencing being in a low-power mode; and
    an error-voltage estimator for enabling switching between the low-power mode and the high-power mode while keeping the voltage switching regulator output in regulation between the desired minimum and maximum voltages, said error voltage estimator is active during said high-power mode and estimates an equilibrium voltage at the output of an error amplifier that is required during said low-power mode, the equilibrium voltage is applied as an initial condition at the output of said error amplifier when transitioning from the high-power mode to the low-power mode, wherein the transient disturbance during changeover is completely suppressed.

2. The voltage switching regulator of claim 1, wherein said error estimator is incorporated with said PWM controller.

3. The voltage switching regulator of claim 1, wherein said PFM controller uses less then 10 μA for power consumption.

4. The voltage switching regulator of claim 1, wherein said PWM controller comprises a high-gain error amplifier.

5. The voltage switching regulator of claim 4, wherein said high-gain error amplifier is coupled to said error-voltage estimator via an inverter circuit.

6. The voltage switching regulator of claim 5, wherein said error-voltage estimator drives said inverter circuit to produce an estimated equilibrium error voltage.

7. The voltage switching regulator of claim 6, wherein said estimated equilibrium error voltage is stored in a capacitor associated with said inverter circuit.

8. The voltage switching regulator of claim 6, wherein said error-voltage estimator uses said estimated equilibrium error voltage to transition between said low-power mode and said high-power mode.

9. A method for performing voltage switching regulation comprising:
    providing a pulsewidth modulation (PWM) controller for providing voltage regulation when a voltage switching regulator is experiencing being in a high-power mode;
    providing a pulse-frequency modulation (PFM) controller for providing voltage regulation when said voltage switching regulator is experiencing being in a low-power mode; and
    providing an error-voltage estimator for enabling switching between the low-power mode and the high-power mode while keeping the voltage switching regulator output in regulation between the desired minimum and maximum voltages, said error voltage estimator is active during said high-power mode and estimates an equilibrium voltage at the output of an error amplifier that is required during said low-power mode, the equilibrium voltage is applied as an initial condition at the output of said error amplifier when transitioning from the high-power mode to the low-power mode, wherein the transient disturbance during changeover is completely suppressed.

10. The method of claim 9, wherein said error-voltage estimator is incorporated with said PWM controller.

11. The method of claim 9, wherein said PFM controller uses less then 10 μA for power consumption.

12. The method of claim 9, wherein said PWM controller comprises a high-gain error amplifier.

13. The method of claim 12, wherein said high-gain error amplifier is coupled to said error-voltage estimator via an inverter circuit.

14. The method of claim 13, wherein said error-voltage estimator drives said inverter circuit to produce an estimated equilibrium error voltage.

15. The method of claim 14, wherein said estimated equilibrium error voltage is stored in a capacitor associated with said inverter circuit.

16. The method of claim 14, wherein said error-voltage estimator uses said estimated equilibrium error voltage to transition between said low-power mode and high-power mode.

* * * * *